US012811194B2

(12) United States Patent
Zamani

(10) Patent No.: US 12,811,194 B2
(45) Date of Patent: Nov. 24, 2026

(54) MODIFIED ANODE FOR LITHIUM METAL BATTERY FOR UNIFORM LITHIUM DEPOSITION

(71) Applicant: Nissan North America, Inc., Franklin, TN (US)

(72) Inventor: Somayeh Zamani, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 889 days.

(21) Appl. No.: 18/186,338

(22) Filed: Mar. 20, 2023

(65) Prior Publication Data

US 2024/0322231 A1 Sep. 26, 2024

(51) Int. Cl.
*H01M 10/0565* (2010.01)
*H01M 4/66* (2006.01)
*H01M 10/0525* (2010.01)

(52) U.S. Cl.
CPC ....... *H01M 10/0565* (2013.01); *H01M 4/661* (2013.01); *H01M 4/665* (2013.01); *H01M 4/666* (2013.01); *H01M 4/667* (2013.01); *H01M 10/0525* (2013.01); *H01M 2300/0094* (2013.01)

(58) Field of Classification Search
CPC ...... H01M 4/661; H01M 4/665; H01M 4/666; H01M 4/667; H01M 4/70; H01M 10/052; H01M 10/0525
See application file for complete search history.

(56) References Cited

U.S. PATENT DOCUMENTS

| | | | | |
|---|---|---|---|---|
| 2015/0132646 | A1 | 5/2015 | Nishikubo et al. | |
| 2019/0181435 | A1* | 6/2019 | Lee | H01M 10/052 |
| 2022/0203659 | A1* | 6/2022 | Knoche | H01M 50/457 |
| 2022/0238885 | A1* | 7/2022 | Koestner | H01M 4/0404 |
| 2022/0263070 | A1* | 8/2022 | He | H01M 4/134 |
| 2023/0395801 | A1* | 12/2023 | Kim | H01M 4/133 |
| 2024/0105984 | A1* | 3/2024 | Parvinian | H01M 4/386 |
| 2024/0120463 | A1* | 4/2024 | Choi | H01M 10/0567 |
| 2024/0204201 | A1* | 6/2024 | Im | H01M 10/0585 |
| 2024/0339596 | A1* | 10/2024 | Kim | H01M 4/1393 |
| 2024/0421320 | A1* | 12/2024 | Jahnke | H01M 4/667 |
| 2025/0140775 | A1* | 5/2025 | Nagy | H01M 4/667 |
| 2025/0233157 | A1* | 7/2025 | Ma | H01M 4/628 |

FOREIGN PATENT DOCUMENTS

JP 2022149660 A 10/2022

* cited by examiner

*Primary Examiner* — Jeremiah R Smith
(74) *Attorney, Agent, or Firm* — Young Basile Hanlon & MacFarlane, P.C.

(57) ABSTRACT

An anode-free lithium metal battery has a cathode current collector, a cathode comprising cathode active material, an electrolyte on the cathode opposite the cathode current collector, a first layer of particles deposited on the electrolyte, and an anode current collector. Each particle of the first layer consists of a first portion of a material having affinity to the electrolyte and a second portion of a material having affinity to lithium, the first portion and the second portion being discrete portions. Each particle is positioned such that the first portion is in contact with the electrolyte and the second portion faces the anode current collector.

19 Claims, 3 Drawing Sheets

MODIFIED ANODE FOR LITHIUM METAL BATTERY FOR UNIFORM LITHIUM DEPOSITION

TECHNICAL FIELD

This disclosure relates to lithium metal batteries having a modified anode, the anode modified to include a layer of particles on one of the electrolyte and the anode current collector, the particles composed of two materials, one of the materials having an affinity for lithium.

BACKGROUND

Advances have been made toward high energy density batteries, using lithium metal as the anode material. Such lithium metal batteries may also be all-solid-state batteries (ASSBs), having all solid materials. Discovery of new materials and the relationship between their structure, composition, properties, and performance have advanced the field. However, even with these advances, batteries remain limited by the underlying choice of materials and electrochemistry. As examples, the large interfacial resistance at the electrolyte/electrode interface and the interfacial stability and compatibility due to lithium reactivity affect the electrochemical performance of lithium metal batteries, particularly due to non-uniform lithium plating and formation of lithium dendrites in the anode.

SUMMARY

Disclosed herein are implementations of lithium metal batteries, including anode-free lithium metal batteries, ASSBs and anode-free ASSBs, in which Janus particles are positioned on one or both of the solid electrolyte and the anode current collector, each Janus particle having a portion with affinity to lithium facing away from the respective solid electrolyte or anode current collector to promote the dense, uniform plating of lithium in the anode.

In an implementation disclosed herein, a lithium metal battery has a cathode current collector, a cathode comprising cathode active material, an electrolyte on the cathode opposite the cathode current collector, a first layer of particles deposited on the electrolyte, and an anode current collector. Each particle of the first layer consists of a first portion of a material having affinity to the solid electrolyte and a second portion of a material having affinity to lithium, the first portion and the second portion being discrete portions. Each particle is positioned such that the first portion is in contact with the electrolyte and the second portion faces the anode current collector.

This implementation may further have a second layer of particles deposited on the anode current collector, each particle of the second layer consisting of a first portion of a material having affinity to the anode current collector and a second portion of the material having affinity to lithium. Each particle is positioned such that the first portion is in contact with the anode current collector and the second portion faces the first layer.

In another implementation disclosed herein, a lithium metal battery has a cathode current collector, a cathode comprising cathode active material, an electrolyte on the cathode opposite the cathode current collector, and an anode current collector. A layer of particles is deposited on the anode current collector. Each particle of the layer consists of a first portion of a material having affinity to the anode current collector and a second portion of a material having affinity to lithium. Each particle is positioned such that the first portion is in contact with the anode current collector and the second portion faces the electrolyte.

In another implementation, an all-solid-state battery has a cathode, a solid electrolyte comprising sulfur, a single layer of nano-sized particles deposited on the solid electrolyte, and an anode current collector. Each particle has a first portion of a first material having affinity to the solid electrolyte and a second portion of a second material having affinity to lithium, wherein the first material and the second material are discrete from each other, and each particle is positioned such that the first portion is in contact with the solid electrolyte.

In another implementation, an anode-free all-solid-state battery has a cathode current collector, a cathode comprising cathode active material, solid electrolyte on the cathode opposite the cathode current collector, a first layer of particles deposited on the solid electrolyte, and an anode current collector. Each particle of the first layer consists of a first portion of a material having affinity to the solid electrolyte and a second portion of a material having affinity to lithium, the first portion and the second portion being discrete portions. Each particle is positioned such that the first portion is in contact with the solid electrolyte and the second portion faces the anode current collector.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
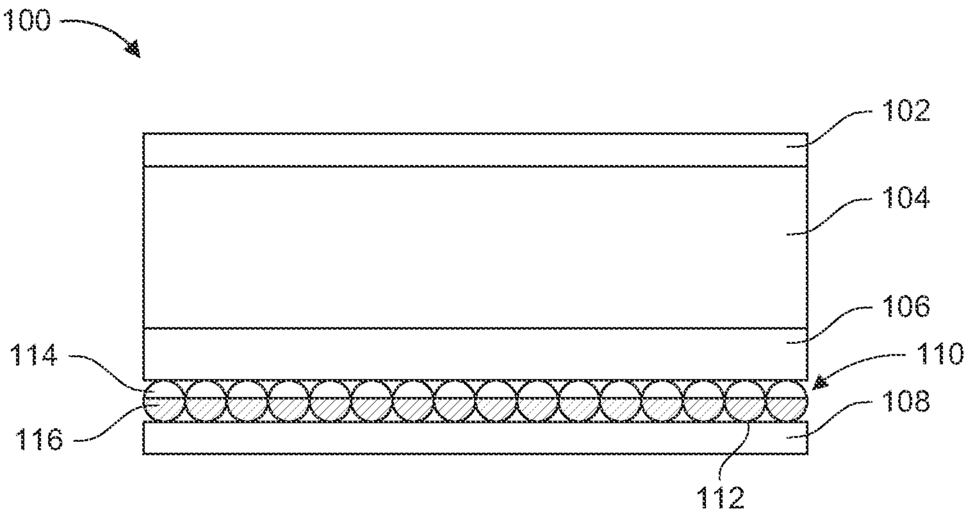
FIG. 1A is a schematic of a side view of an implementation of an anode-free lithium metal battery as disclosed herein.

Conventional lithium metal batteries have a cathode, an electrolyte and lithium or lithium alloy anode, along with a cathode current collector and anode current collector. More recently, anode-free lithium metal batteries have been developed, in which lithium is absent from the manufactured battery and only deposits between the anode current collector and the electrolyte during charging. Most commonly, anode-free batteries are anode-free ASSBs.

In either the conventional lithium metal batteries or the anode-free lithium metal batteries, non-uniform deposition of lithium is problematic. During battery operation, lithium is continuously deposited and removed. As the lithium is deposited, it may not deposit uniformly, forming dendrites, which are tiny, rigid branch-like structures and needle-like projections. The formation of dendrites results in a non-uniform lithium surface which further exacerbates non-uniform lithium deposition. As the dendrites grow from this non-uniform deposition, voids form within the lithium and between the lithium and the electrolyte and lithium and anode current collector. Both the low-density lithium dendrite deposition and the loss of contact between layers adds to cell expansion during charging. As the lithium dendrites reach the other electrode, short circuiting of the battery can occur. Also, side reactions between lithium metal and the electrolyte can further contribute to the decrease in performance.

Implementations of lithium metal batteries are disclosed herein that provide an interfacial layer of particles on one or both of the electrolyte and the anode current collector. The particles are Janus particles composed of two different materials, the Janus particles having two discrete sides with different physical properties. The Janus particle allows two different types of chemistry to occur on the same particle, with one portion of the particle allowing one type of chemistry and the other portion of the particle allowing the other type of chemistry. The portions are not mixed, but are rather discrete within the particle. The particles are self-aligning while the battery is in use due to the differing physical properties of the particles and the respective affinity for opposing materials within the battery.

In one implementation, an anode-free lithium metal battery has a single layer of nano-sized particles deposited on the electrolyte on a surface facing the anode current collector. The particles are made of material A, having affinity to the electrolyte, and material B, having affinity to lithium. Material A and material B are discrete within the particle. As used herein, "discrete" means that the materials are not a composite and are not mixed within the particle. The particles are deposited such that material A is in contact with the electrolyte and material B faces the anode current collector. As the anode-free lithium metal battery is charged, lithium will deposit between material B and the anode current collector. Due to the affinity between lithium and material B, the lithium will deposit more densely and more uniformly.

In another implementation, an anode-free lithium metal battery has a single layer of nano-sized particles deposited on the anode current collector on a surface facing the electrolyte. The particles are made of material C, having affinity to the material of the anode current collector, and material B, having affinity to lithium. Material C and material B are discrete within the particle. The particles are deposited such that material C is in contact with the anode current collector and material B faces the electrolyte. As the anode-free lithium metal battery is charged, lithium will deposit between material B and the electrolyte. Due to the affinity between lithium and material B, the lithium will deposit more densely and more uniformly.

In another implementation, an anode-free lithium metal battery has a single layer of nano-sized particles having materials A and B deposited on the electrolyte on a surface facing the anode current collector and another single layer of nano-sized particles having materials C and B deposited on the anode current collector on a surface facing the electrolyte. As the anode-free lithium metal battery is charged, lithium will deposit between material B of each single layer of particles. Due to the affinity between lithium and material B, the lithium will deposit more densely and more uniformly.

It is also contemplated that the implementations described may be manufactured with a layer of lithium metal, lithium alloy or doped lithium present as the anode prior to charging.

Janus particles may be produced in various ways. As a non-limiting example, Janus particles can be fabricated using a microfluidics device and electrohydrodynamic jetting of two polymer liquid solutions. Other methods, such as surface nucleation and seeded growth, can be used. The methods of fabrication allow for the particle sizes to be manipulated as desired. The proportion of the materials in a Janus particle may also be manipulated with these fabrication processes. For example, the Janus particles may be approximately evenly split between the material A and material B, such that half of the particle is material A and half of the particle is material B. Alternatively, the portion of the particle being material B, with the affinity toward lithium, may constitute a larger portion of the particle, with the portion of the particle being material A being smaller.

FIGS. 1A-3B show different embodiments of the disclosed lithium metal batteries utilizing Janus particles to promote dense, uniform lithium deposition in the anode. As illustrated in FIG. 1A, an anode-free lithium metal battery 100 has a cathode current collector 102 and a cathode 104 comprising cathode active material. The cathode current collector 102 can be, as non-limiting examples, an aluminum sheet or foil, carbon paper or graphene paper. The cathode active material comprises one or more electrochemically active cathode materials known for use in solid-state batteries, such as lithium-containing oxide (e.g., lithium cobalt oxide ($LiCoO_2$), lithium manganese oxide ($LiMnO_2$), lithium nickel manganese cobalt oxide (LiNMC), lithium vanadium oxide ($LiVO_2$), lithium chromium oxide ($LiCrO_2$), lithium nickel oxide ($LiNiO_2$), lithium nickel cobalt aluminum oxide ($LiNiCoA_1O_2$), and other transition metal oxides, or lithium iron phosphate ($LiFePO_4$)) and other similar materials. Other cathode active materials can be, but are not limited to, sulfur-based active materials including $LiSO_2$, $LiSO_2Cl_2$, $LiSOCl_2$, and $LiFeS_2$. The cathode active material can also include one or both of a carbon material for electron conductivity and an electrolyte. A binder, such as a fiber, can also be included. As a non-limiting example, the cathode 104 can be a mixture of carbon, Li-NMC, a solid-state electrolyte and a fiber binder. The ratio of materials may be 80 Li-NMC/15 electrolyte/3 carbon/2 binder, as a non-limiting example.

The anode-free lithium metal battery 100 also has an electrolyte 106 on the cathode 104 opposite the cathode current collector 102. Examples of materials that can be employed as the electrolyte 106 include, but are not limited to, solid electrolytes. The solid electrolytes can be sulfur containing compounds and their derivatives, such as Argyrodites, $Li_6PS_5Cl$, $Li_{10}GeP_2S_{12}$ (LGPS), $Li_2P_3S_{11}$ (LPS), etc. Other chemistries that can be employed as the solid electrolyte include garnet structure oxides (e.g. $Li_2La_3Zr_2O_{12}$ (LLZO) with various dopants), NASICON-type phosphate glass ceramics such as $Li_{1.5}Al_{0.5}Ti_{1.5}(PO_4)_3$ (LATP), oxynitrides (e.g. lithium phosphorus oxynitride or LIPON), and polymers such as polyethylene oxide (PEO).

The electrolyte 106 may also be a semi-solid gel polymer electrolyte that is semi-solid, having sufficient viscosity to maintain its shape so that the gel polymer electrolyte does not migrate into voids between particles. Viscosity may be controlled by the percentage of double bonds that are crosslinked in the gel polymer. Materials used for the semi-solid gel electrolyte include acrylate polymers, such as polyethylene glycol dimethacrylate (PEGDMA) and poly (ethylene glycol) diacrylate (PEGDA), with the inclusion of salts such as LiFSI, LiTFSI, $LiPF_6$, and ionic liquids or ceramic fillers to improve ionic conductivity. Examples of ionic liquids with high ionic conductivity include, but are not limited to, 1-ethyl 3-methylimidazolium thio-cyanate, 1-ethyl 3-methylimidazolium dicyanamide, and 1-ethyl-3-methylimidazolium tetrafluoroborate.

It is further contemplated that liquid electrolytes and less viscous gel electrolytes may be used with the inclusion of a separator as an interlayer, or both a separator and an interlayer. It is also contemplated that a combination of electrolytes may be used, such as multiple layers of solid electrolytes or combinations of layers of solid electrolytes and liquid or gel electrolytes.

The anode-free lithium metal battery 100 also has anode current collector 108 that can be, as a non-limiting example, a sheet or foil of copper, nickel, a copper-nickel alloy, carbon paper, or graphene paper.

The anode-free lithium metal battery 100 has a layer 110 of particles 112 deposited on the electrolyte 106. Each particle 112 of the layer 110 consists of a first portion 114 of a material having affinity to the electrolyte 106 and a second portion 116 of a material having affinity to lithium. Each particle 112 is positioned such that the first portion 114 is in contact with the electrolyte 106 and the second portion 116 faces the anode current collector 108. The discrete first portion 114 and discrete second portion 116 are illustrated in FIG. 1A, with the first portion 114 with the material having affinity to the electrolyte 106 illustrated as white and the second portion 116 with the material having affinity to lithium illustrated as black. The second portion 116 with the material having affinity to lithium can be one or both of zinc oxide and gold.

The layer 110 of particles 112 is a single layer of nano-sized particles. Using particles that are nano-sized rather than a coating of material allows for a thinner layer, which thereby contributes to a thinner cell. Using particles instead of a layer of material results in reduced interfacial problems that arise when using a continuous layer of material against the electrolyte. Interfacial problems can include delamination, cracking and other issues. Utilizing the Janus particle, with the dual affinity for both the electrolyte and lithium metal further improves the interfacial adhesion and reduces resistance across the cell.

When the electrolyte 106 comprises sulfur, whether a solid or a semi-solid gel electrolyte, the material of the first portion 114 can be a nitrogen containing material such as an amine or amide, or a nitrogen-doped carbon material such as carbon nanotubes, carbon nanofibers or graphite. Nitrogen and sulfur have Lewis acid-base interactions that improve the interface stability. When the electrolyte 106 comprises sulfur, the material of the first portion 114 can be silver or molybdenum or a combination. When the electrolyte 106 is LiPON, the material of the first portion 114 can be a hydrophilic material containing functional groups of amides, phosphates, or sulfides. One example is $MoS_2$. When the electrolyte 106 is a thio-based sulfide electrolyte, the material of the first portion 114 having affinity to the electrolyte can comprise a double bond containing chemical, such as an acrylate or an acrylated compound. In such a case, a "click" reaction of thio-eyne will take place to make a chemical bond between the particle and the electrolyte.

Figure 1B:
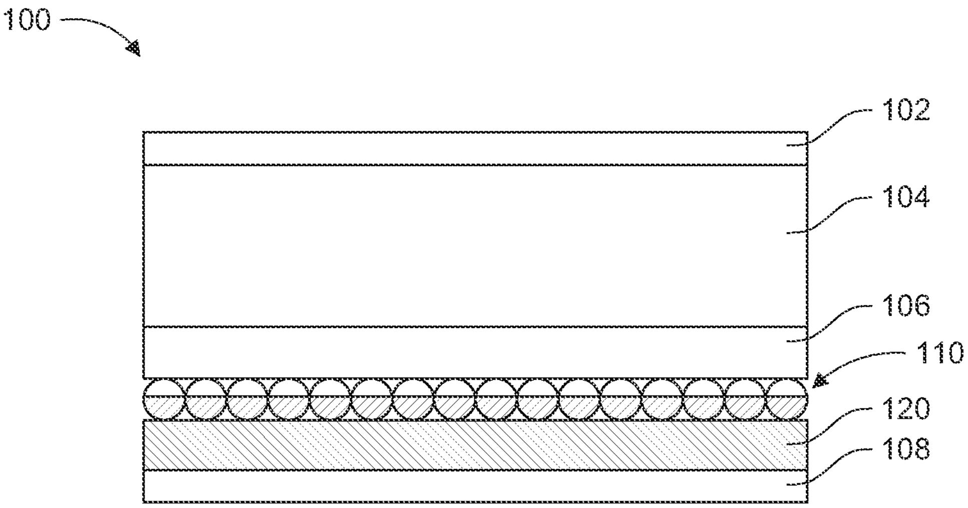
FIG. 1B is the lithium metal battery of FIG. 1A after charging.

FIG. 1B is the lithium metal battery of FIG. 1A illustrating lithium metal 120 densely and uniformly deposited between the anode current collector 108 and the layer 110 of particles 112.

Figure 2A:
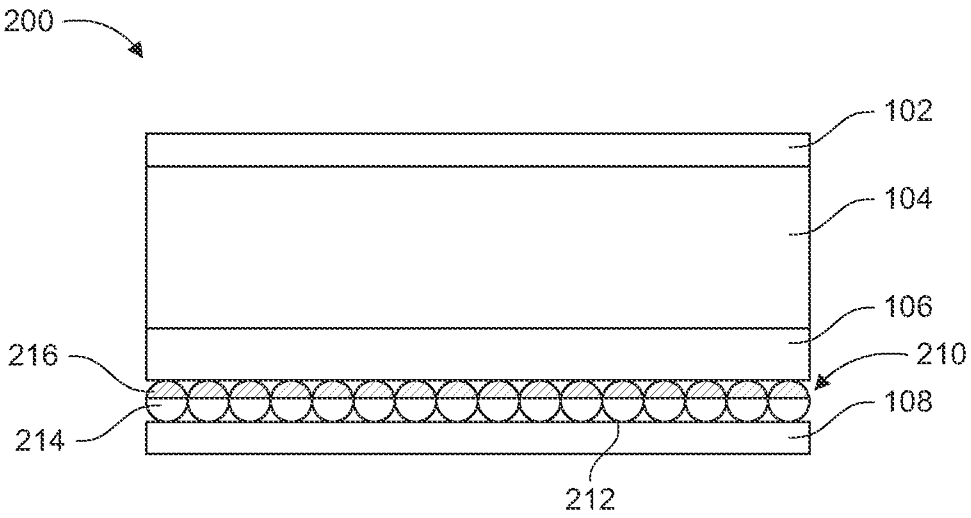
FIG. 2A is a schematic of a side view of another implementation of an anode-free lithium metal battery as disclosed herein.
Figure 2B:
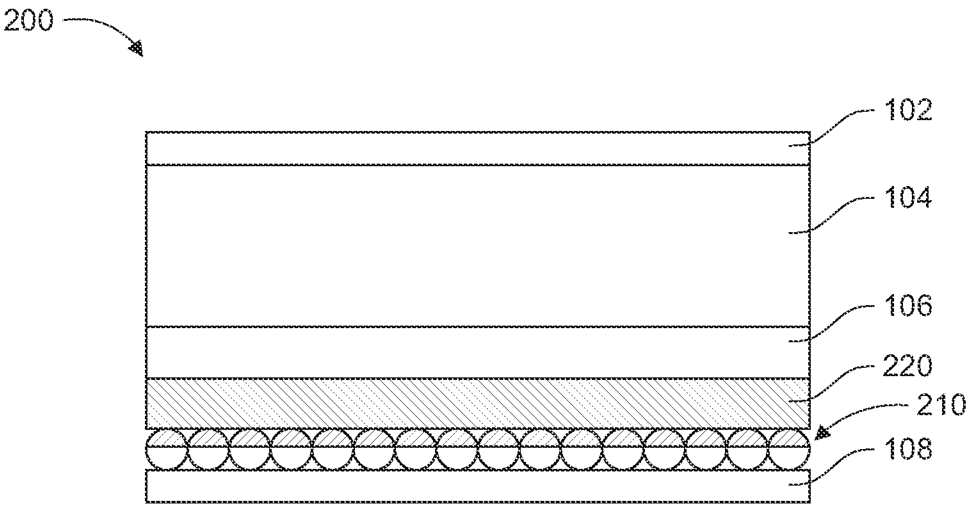
FIG. 2B is the lithium metal battery of FIG. 2A after charging.

FIGS. 2A and 2B depict another implementation of a lithium metal battery utilizing Janus particles to promote dense, uniform lithium deposition in the anode. Components that are the same across implementations will have the same reference number. As illustrated in FIG. 2A, an anode-free lithium metal battery 200 has a cathode current collector 102 and a cathode 104 comprising cathode active material. As with the first implementation, the cathode current collector 102 can be, as non-limiting examples, an aluminum sheet or foil, carbon paper or graphene paper. The cathode active material comprises one or more electrochemically active cathode materials known for use in solid-state batteries, such as lithium-containing oxide (e.g., lithium cobalt oxide ($LiCoO_2$), lithium manganese oxide ($LiMnO_2$), lithium nickel manganese cobalt oxide (LiNMC), lithium vanadium oxide ($LiVO_2$), lithium chromium oxide ($LiCrO_2$), lithium nickel oxide ($LiNiO_2$), lithium nickel cobalt aluminum oxide ($LiNiCoAlO_2$), and other transition metal oxides, or lithium iron phosphate ($LiFePO_4$)) and other similar materials. Other cathode active materials can be, but are not limited to, sulfur-based active materials including $LiSO_2$, $LiSO_2C_{12}$, $LiSOCl_2$, and $LiFeS_2$. The cathode active material can also include one or both of a carbon material for electron conductivity and an electrolyte. A binder, such as a fiber, can also be included.

The anode-free lithium metal battery 200 also has an electrolyte 106 on the cathode 104 opposite the cathode current collector 102. Examples of materials that can be employed as the electrolyte 106 include, but are not limited to, solid electrolytes. The solid electrolytes can be sulfur containing compounds and their derivatives, such as Argyrodites, $Li_6PS_5Cl$, $Li_{10}GeP_2S_{12}$ (LGPS), $Li_7P_3S_{11}$ (LPS), etc. Other chemistries that can be employed as the solid electrolyte include garnet structure oxides (e.g. $Li_7La_3Zr_2O_{12}$ (LLZO) with various dopants), NASICON-type phosphate glass ceramics such as $Li_{1.5}Al_{0.5}Ti_{1.5}(PO_4)_3$ (LATP), oxynitrides (e.g. lithium phosphorus oxynitride or LIPON), and polymers such as polyethylene oxide (PEO).

The electrolyte 106 may also be a gel polymer electrolyte that is semi-solid, having sufficient viscosity to maintain its shape so that the gel polymer electrolyte does not migrate into voids between particles. Viscosity may be controlled by the percentage of double bonds that are crosslinked in the gel polymer. Materials used for the semi-solid or gel electrolyte include acrylate polymers, such as polyethylene glycol dimethacrylate (PEGDMA) and poly(ethylene glycol) diacrylate (PEGDA), with the inclusion of salts such as LiFSI, LiTFSI, $LiPF_6$, and ionic liquids or ceramic fillers to improve ionic conductivity. Examples of ionic liquids with high ionic conductivity include, but are not limited to, 1-ethyl 3-methylimidazolium thio-cyanate, 1-ethyl 3-methylimidazolium dicyanamide, and 1-ethyl-3-methylimidazolium tetrafluoroborate.

It is further contemplated that liquid electrolytes and less viscous gel electrolytes may be used with the inclusion of a separator as an interlayer, or both a separator and an interlayer. It is also contemplated that a combination of electrolytes may be used, such as multiple layers of solid electrolytes or combinations of layers of solid electrolytes and liquid or gel electrolytes.

The anode-free lithium metal battery 200 also has anode current collector 108 that can be, as a non-limiting example, a sheet or foil of copper, nickel, a copper-nickel alloy, carbon paper, or graphene paper.

The anode-free lithium metal battery 200 has a layer 210 of particles 212 deposited on the anode current collector 108. Each particle 212 of the layer 210 consists of a first portion 214 of a material having affinity to the anode current collector 108 and a second portion 216 of a material having affinity to lithium. Each particle 212 is positioned such that the first portion 214 is in contact with the anode current collector 108 and the second portion 216 faces the electrolyte 106. The discrete first portion 214 and discrete second portion 216 are illustrated in FIG. 2A, with the first portion 214 with the material having affinity to the anode current collector 108 illustrated as white and the second portion 216 with the material having affinity to lithium illustrated as black.

The first portion 214 with the material having affinity for the anode current collector 108 can be an acrylate, such as cyanoacrylate, when the anode current collector 108 is copper. Other examples of the material of the first portion 214 are zinc or a clay ceramic when the anode current collector 108 is copper. The second portion 216 with the material having affinity to lithium can be one or both of zinc oxide and gold.

The layer 210 of particles 212 is a single layer of nano-sized particles. Using particles that are nano-sized rather than a coating of material allows for a thinner layer, which thereby contributes to a thinner cell. Using particles instead of a layer of material results in reduced interfacial problems that arise when using a continuous layer of material against the anode current collector. Interfacial problems can include delamination, cracking and other issues. Utilizing the Janus particle, with the dual affinity for both the anode current collector and lithium metal further improves the interfacial adhesion and reduces resistance across the cell.

FIG. 2B is the lithium metal battery of FIG. 2A illustrating lithium metal 220 densely and uniformly deposited between the layer 210 of particles 212 and the electrolyte 106.

Figure 3A:
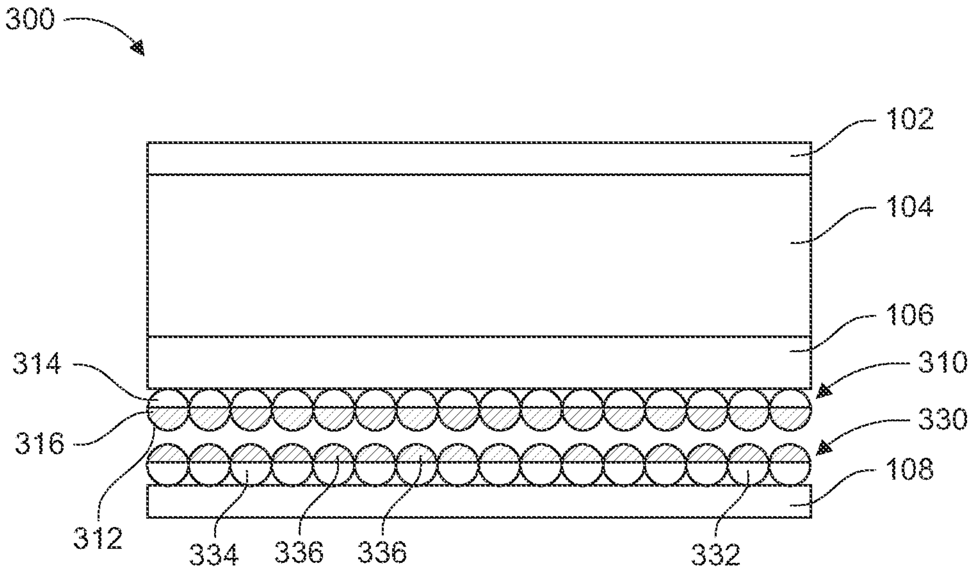
FIG. 3A is a schematic of a side view of another implementation of an anode-free lithium metal battery as disclosed herein.
Figure 3B:
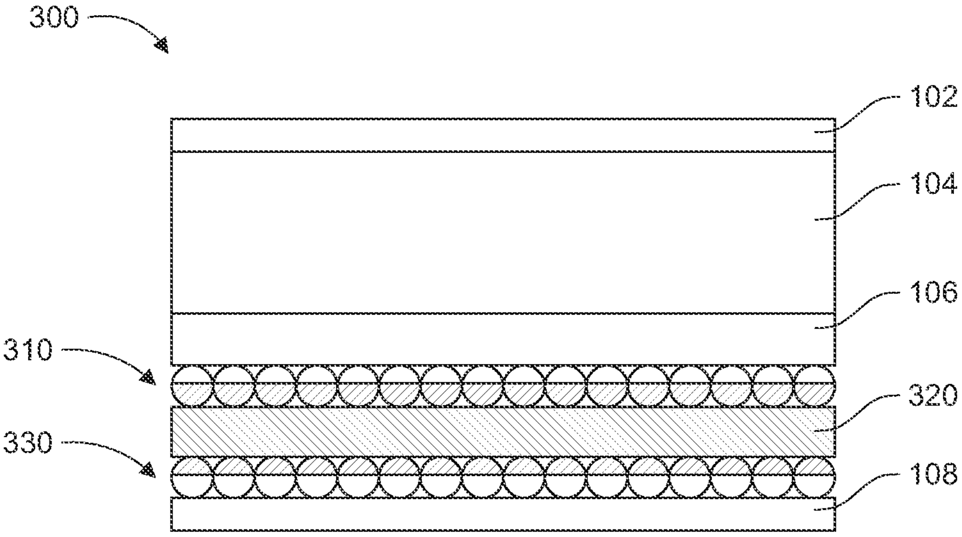
FIG. 3B is the lithium metal battery of FIG. 3A after charging.

FIGS. 3A and 3B depict another implementation of a lithium metal battery utilizing Janus particles to promote dense, uniform lithium deposition in the anode. Components that are the same across implementations will have the same reference number. As illustrated in FIG. 3A, an anode-free lithium metal battery 300 has a cathode current collector 102 and a cathode 104 comprising cathode active material. As with the first and second implementations, the cathode current collector 102 can be, as non-limiting examples, an aluminum sheet or foil, carbon paper or graphene paper. The cathode active material comprises one or more electrochemically active cathode materials known for use in solid-state batteries, such as lithium-containing oxide (e.g., lithium cobalt oxide ($LiCoO_2$), lithium manganese oxide ($LiMnO_2$), lithium nickel manganese cobalt oxide (LiNMC), lithium vanadium oxide ($LiVO_2$), lithium chromium oxide ($LiCrO_2$), lithium nickel oxide ($LiNiO_2$), lithium nickel cobalt aluminum oxide ($LiNiCoAlO_2$), and other transition metal oxides, or lithium iron phosphate ($LiFePO_4$)) and other similar materials. Other cathode active materials can be, but are not limited to, sulfur-based active materials including $LiSO_2$, $LiSO_2Cl_2$, $LiSOCl_2$, and $LiFeS_2$. The cathode active material can also include one or both of a carbon material for electron conductivity and an electrolyte. A binder, such as a fiber, can also be included.

The anode-free lithium metal battery 300 also has an electrolyte 106 on the cathode 104 opposite the cathode current collector 102. Examples of materials that can be employed as the electrolyte 106 include, but are not limited to, solid electrolytes. The solid electrolytes can be sulfur containing compounds and their derivatives, such as Argyrodites, $Li_6PS_5Cl$, $Li_{10}GeP_2S_{12}$ (LGPS), $Li_7P_3S_{11}$ (LPS), etc. Other chemistries that can be employed as the solid electrolyte include garnet structure oxides (e.g. $Li_2La_3Zr_2O_{12}$ (LLZO) with various dopants), NASICON-type phosphate glass ceramics such as $Li_{1.5}Al_{0.5}Ti_{1.5}(PO_4)_3$ (LATP), oxynitrides (e.g. lithium phosphorus oxynitride or LIPON), and polymers such as polyethylene oxide (PEO).

The electrolyte 106 may also be a gel polymer electrolyte that is semi-solid, having sufficient viscosity to maintain its shape so that the gel polymer electrolyte does not migrate into voids between particles. Viscosity may be controlled by the percentage of double bonds that are crosslinked in the gel polymer. Materials used for the semi-solid or gel electrolyte include acrylate polymers, such as polyethylene glycol dimethacrylate (PEGDMA) and poly(ethylene glycol) diacrylate (PEGDA), with the inclusion of salts such as LiFSI, LiTFSI, $LiPF_6$, and ionic liquids or ceramic fillers to improve ionic conductivity. Examples of ionic liquids with high ionic conductivity include, but are not limited to, 1-ethyl 3-methylimidazolium thio-cyanate, 1-ethyl 3-methylimidazolium dicyanamide, and 1-ethyl-3-methylimidazolium tetrafluoroborate.

It is further contemplated that liquid electrolytes and less viscous gel electrolytes may be used with the inclusion of a separator as an interlayer, or both a separator and an interlayer. It is also contemplated that a combination of electrolytes may be used, such as multiple layers of solid electrolytes or combinations of layers of solid electrolytes and liquid or gel electrolytes.

The anode-free lithium metal battery 300 also has anode current collector 108 that can be, as a non-limiting example, a sheet or foil of copper, nickel, a copper-nickel alloy, carbon paper, or graphene paper.

The anode-free lithium metal battery 300 has a first layer 310 of particles 312 deposited on the electrolyte 106. Each particle 312 of the layer 310 consists of a first portion 314 of a material having affinity to the electrolyte 106 and a second portion 316 of a material having affinity to lithium. Each particle 312 is positioned such that the first portion 314 is in contact with the electrolyte 106 and the second portion 316 faces the anode current collector 108. The discrete first portion 314 and discrete second portion 316 are illustrated in FIG. 3A, with the first portion 314 with the material having affinity to the electrolyte 106 illustrated as white and the second portion 316 with the material having affinity to lithium illustrated as black. The second portion 316 with the material having affinity to lithium can be one or both of zinc oxide and gold.

When the electrolyte 106 comprises sulfur, the material of the first portion 314 can be a nitrogen containing material such as an amine or amide, or a nitrogen-doped carbon material such as carbon nanotubes, carbon nanofibers or graphite. Nitrogen and sulfur have Lewis acid-base interactions that improve the interface stability. When the electrolyte 106 comprises sulfur, the material of the first portion 314 can be silver or molybdenum or a combination. When the electrolyte 106 is LiPON, the material of the first portion 314 can be a hydrophilic material containing functional groups of amides, phosphates, or sulfides. One example is $MoS_2$. When the electrolyte 106 is a thio-based sulfide electrolyte, the material of the first portion 314 having affinity to the electrolyte can comprise a double bond containing chemical, such as an acrylate or an acrylated compound. In such a case, a "click" reaction of thio-eyne will take place to make a chemical bond between the particle and the electrolyte.

The anode-free lithium metal battery 300 has a second layer 330 of particles 332 deposited on the anode current collector 108. Each particle 332 of the layer 330 consists of a first portion 334 of a material having affinity to the anode current collector 108 and a second portion 336 of a material having affinity to lithium. Each particle 332 is positioned such that the first portion 334 is in contact with the anode current collector 108 and the second portion 336 faces the electrolyte 106. The discrete first portion 334 and discrete second portion 336 are illustrated in FIG. 3A, with the first portion 334 with the material having affinity to the anode current collector 108 illustrated as white and the second portion 336 with the material having affinity to lithium illustrated as black.

The first portion 334 with the material having affinity for the anode current collector 108 can be an acrylate, such as cyanoacrylate, when the anode current collector 108 is copper. Other examples of the material of the first portion 334 are zinc or a clay ceramic when the anode current collector 108 is copper. The second portion 336 with the material having affinity to lithium can be one or both of zinc oxide and gold.

FIG. 3B is the lithium metal battery of FIG. 3A illustrating lithium metal 220 densely and uniformly deposited between the first layer 310 of particles 312 and the second layer 330 of particles 332.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An anode-free lithium metal battery, comprising:
- a cathode current collector;
- a cathode comprising cathode active material;
- an electrolyte on the cathode opposite the cathode current collector;
- a first layer of particles deposited on the electrolyte, each particle of the first layer consisting of:
  - a first portion of a material having affinity to the electrolyte; and
  - a second portion of a material having affinity to lithium, the first portion and the second portion being discrete portions; and
- an anode current collector, wherein each particle is positioned such that the first portion is in contact with the electrolyte and the second portion faces the anode current collector.

2. The anode-free lithium metal battery of claim 1, wherein the first layer of particles is a single layer of nano-sized particles.

3. The anode-free lithium metal battery of claim 1, wherein the electrolyte comprises sulfur.

4. The anode-free lithium metal battery of claim 3, wherein the material having affinity to the electrolyte comprises nitrogen.

5. The anode-free lithium metal battery of claim 3, wherein the material having affinity to the electrolyte is a nitrogen-doped carbon material.

6. The anode-free lithium metal battery of claim 3, wherein the material having affinity to the electrolyte comprises one or both of silver and molybdenum.

7. The anode-free lithium metal battery of claim 1, wherein the electrolyte is a thio-based sulfide electrolyte and the material having affinity to the electrolyte comprises an acrylate or an acrylated compound.

8. The anode-free lithium metal battery of claim 1, wherein the material having affinity to lithium is one or both of zinc oxide and gold.

9. The anode-free lithium metal battery of claim 1, wherein the first portion is approximately one half of a particle, and the second portion is approximately another half of the particle.

10. The anode-free lithium metal battery of claim 1, wherein the electrolyte is a semi-solid gel electrolyte.

11. The anode-free lithium metal battery of claim 1, further comprising:
- a second layer of particles deposited on the anode current collector, each particle of the second layer consisting of:
  - a first portion of a material having affinity to the anode current collector; and
  - a second portion of the material having affinity to lithium, wherein each particle is positioned such that the first portion is in contact with the anode current collector and the second portion faces the first layer.

12. The anode-free lithium metal battery of claim 11, wherein the anode current collector is copper and the material having affinity to the anode current collector is an acrylate.

13. The anode-free lithium metal battery of claim 11, wherein the anode current collector is copper and the material having affinity to the anode current collector is zinc.

14. The anode-free lithium metal battery of claim 11, wherein the second layer of particles is a single layer of nano-sized particles.

15. The anode-free lithium metal battery of claim 11, wherein the first portion of a particle in the second layer is approximately one half and the second portion of the particle in the second layer is approximately another half.

16. The anode-free lithium metal battery of claim 11, wherein the first portion of a particle of the second layer is smaller than the second portion of the particle in the second layer.

17. A lithium metal battery, comprising:

a cathode;

an electrolyte comprising sulfur;

a single layer of nano-sized particles deposited on the electrolyte, each particle having a first portion of a first material having affinity to the electrolyte and a second portion of a second material having affinity to lithium, wherein the first material and the second material are discrete from each other, and each particle is positioned such that the first portion is in contact with the electrolyte, and the first material comprises one or both of silver and molybdenum; and an anode current collector.

18. The lithium metal battery of claim 17, wherein the first material comprises nitrogen.

19. The lithium metal battery of claim 17, wherein the second material is one or both of zinc oxide and gold.

* * * * *